Feb. 13, 1951        J. A. GRIER        2,541,757

LIQUID AND GAS CONTACT APPARATUS

Filed Oct. 25, 1945        3 Sheets-Sheet 1

INVENTOR.

John Alfred Grier

Feb. 13, 1951 J. A. GRIER 2,541,757
LIQUID AND GAS CONTACT APPARATUS
Filed Oct. 25, 1945 3 Sheets-Sheet 2

INVENTOR.
John Alfred Grier

Feb. 13, 1951 J. A. GRIER 2,541,757
LIQUID AND GAS CONTACT APPARATUS
Filed Oct. 25, 1945 3 Sheets-Sheet 3

INVENTOR.
John Alfred Grier

Patented Feb. 13, 1951

2,541,757

UNITED STATES PATENT OFFICE 2,541,757

LIQUID AND GAS CONTACT APPARATUS

John Alfred Grier, Bronxville, N. Y., assignor, by mesne assignments, to Cleveland-Detroit Corporation, a corporation of Delaware Application October 25, 1945, Serial No. 624,365

6 Claims. (Cl. 261—11)

This invention relates to improvements in liquid and gas contact apparatus, and has for an object the provision of such apparatus including means for effecting a maximum absorption of the gas by the liquid, and the greatest retention in the liquid of the gas absorbed.

Another object of the invention is the provision in carbonating apparatus of common means for cooling the water prior to carbonating, during carbonating, and after carbonation has been effected.

A further object of the invention is the provision in carbonating apparatus of a surface against which water is sprayed in the presence of $CO_2$ gas, the temperature of said surface approaching the temperature at which the water (in its liquid state) absorbs a maximum of the gas.

Yet another object of the invention is the provision, in a carbonator, of a tank for the carbonated water, a tubular refrigerated low side within and having its axis parallel to the axis of said tank, means about the outer wall of said low side to cool the water prior to carbonation, and means for directing a spray of the cooled water against the cold inner wall of said low side in the presence of the $CO_2$ gas.

A further object of the invention is the provision, within the inner wall of the tubular refrigerated low side, of means in heat exchange relation with said low side for increasing the refrigerated surface over which the spray trickles as it moves downwardly toward the bottom of the tank, thereby increasing the contact between the finely divided particles of water and the gas.

Another object of the invention is the provision of a refrigerated low side unit of tubular form, having inner and outer tubular chambers connected to a high side refrigerating unit, and a third tubular chamber embraced and bounded by said inner and outer chambers, the walls of said third chamber being common with the adjacent walls of the inner and the outer chambers.

Other objects and advantages of the invention will be apparent to those skilled in the art, upon a study of the following specification and the accompanying drawings.

Referring to the drawings.

Figure 7:
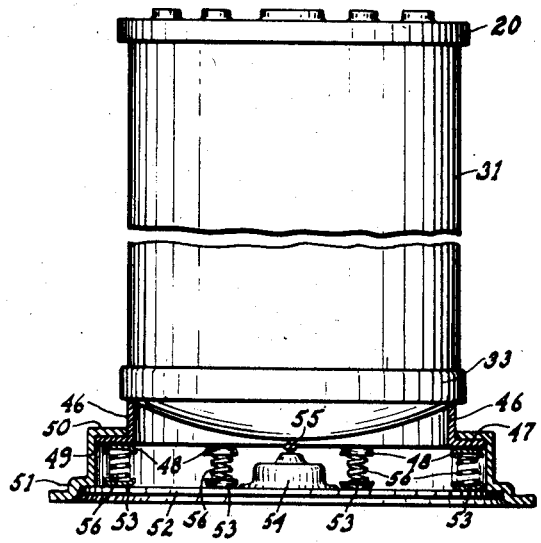
Figure 8:
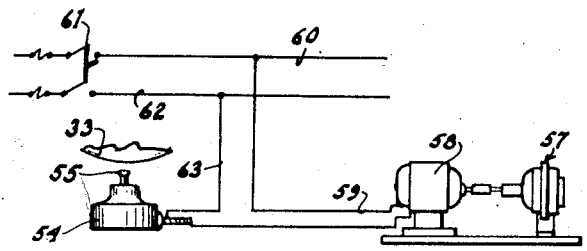

Figure 7 is an elevation of the device shown in Figures 1 to 5 inclusive in combination with a preferred means for opening a switch when a predetermined quantity of carbonated water is contained in the tank and for closing said switch when the quantity of carbonated water in said tank has been reduced to a second predetermined quantity; and Figure 8 is a circuit diagram showing the electrical circuits employed in my new and improved carbonating system.

Figure 2:
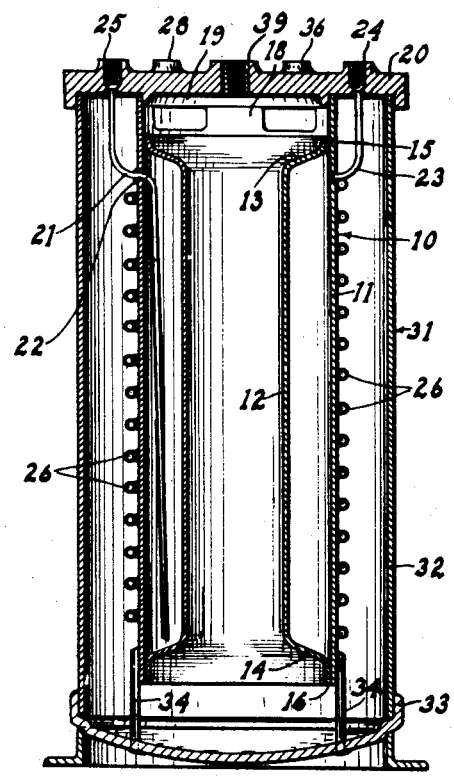
Figure 2 is a sectional elevation taken along the lines 2—2 of Figure 1, and showing the circuit of a refrigerant through the device and other details.
Figure 4:
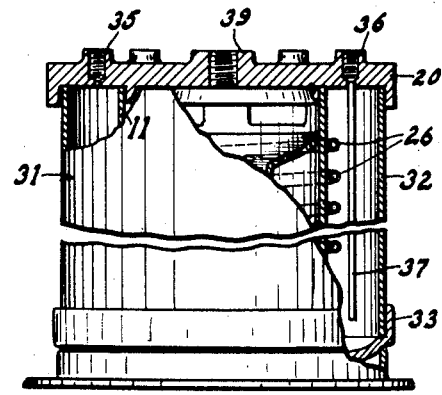
Figure 4 is a fragmentary sectional elevation taken along the lines 4—4 of Figure 1, and showing the connection for leading the $CO_2$ into the device and also the pipe for delivering the carbonated water from the tank.

Referring first to Figure 2, which shows the refrigerating element, the cooling coils for the water, and other details, the refrigerating element or "low side" 10 consists of a cylindrical member 11 which forms the outer wall thereof, and a second cylindrical member 12 within the outer cylindrical member 11. The end 13 of the member 12 is flared outwardly to meet the interior surface of the member 11 near the upper end thereof, and is welded thereto about its entire line of contact, as indicated at 15. The other end 14 of the member 12 is also flared outwardly to meet the interior surface of the member near the lower end thereof at the bottom end of the member 11, and is welded thereto about its entire line of contact as indicated by the numeral 16. Except for the inlet and outlet connections, this low side unit 10 is fluid tight, and performs three functions all of which are conductive to the delivery of a higher grade of carbonated water than existing devices for carbonating water:

(a) The outer cylindrical wall 11 is in heat exchange relation with means to be presently described for initially cooling the water to a substantially low temperature before it is carbonated.

(b) The inner cylindrical wall 12 forms a refrigerated surface (at least as cold as, or colder than the initially cooled water) against which said water is sprayed in the presence of $CO_2$ gas.

(c) The carbonated water settles to the bottom of the tank, to be presently described, and since the low side is partially submerged in the carbonated water, it refrigerates the carbonated water until it is withdrawn from the tank.

The upper end of the cylindrical member 11, above the circular weld 15 has a plurality of openings 17 formed therein, leaving a plurality of webs 18 therebetween.

A metallic plate 20, forming the top of the carbonator, has a downwardly projecting annular flange 19 formed thereon, and the webs 18 are welded or otherwise rigidly secured to the flange 19.

A conduit 21, for delivering liquid refrigerant to the lower end of the evaporator 10, may pass through the cylindrical wall 11 through an opening at the point 22 and may be welded to seal up the opening through which it passes. An L shaped conduit 23 has its lower leg terminating in a hole at the upper end of the evaporator and is welded into said hole with a fluid tight seal, and the other leg of this conduit terminates in a boss 24 formed in the plate 20. The upper end of the conduit 21 terminates in a boss 25 formed in the plate 20. Both these conduits may be welded into the plate 20, or they may be secured in any other desired manner. Caution must be exercised to insure that no refrigerant leaks can possibly occur.

Wound about the outer wall 11 of the evaporator is a coil of tubing 26, and one end 27 leads from the lower end of the coil 26 to a boss 28 formed on the plate 20. The other end 29 leads from the upper end of the coil to a boss 30 formed on the plate 20. Water may be delivered to either end of the coil 26 and removed from the other, and since the coil is in heat exchange relation with the evaporator 10, the water is rapidly cooled.

The webs 18 are welded to the flange 19, and the respective conduits and the ends of the water coil may be secured in fluid tight relation to the head 20 and tested before the outer tank 31 is assembled on the head 20.

The head 20 has a second downwardly projecting annular flange, this second flange being at the circumference thereof also formed integral therewith, and to this second flange the upper end of the tank 31 is welded.

The tank 31 may be formed in one piece, but I prefer to fabricate it of a cylindrical member 32 with a domed bottom member 33 welded onto the bottom end thereof. The lower end of the evaporator may have anchor rods 34 secured thereto, and these anchor rods may extend through holes in the bottom member 33 when the upper end of the tank 31 is positioned on the flange 32 and welded thereto. The projecting ends of the anchor rods may then be cut off, and these rods may be welded into the holes through which they extended, to form a fluid tight joint. These anchor rods hold the lower end of the evaporator rigidly so that the device may withstand severe shocks without damage.

A boss 35 formed integral with the plate 20 (Figure 4), has a threaded hole therein, into which a fitting may be screwed for leading the $CO_2$ gas into the top of the tank. A boss 36 also formed integral with the plate 20, has a threaded hole therein and extending downwardly therefrom to a point near the bottom of the tank is a pipe 37 through which carbonated water is delivered from the tank.

A boss 38 also formed integral with the plate 20 (Figure 1) is provided for purging air from the tank, and a central boss 39 formed integral with the plate has a threaded hole formed therein to accommodate a nozzle fitting 40, the lower end 42 of which is adapted to atomize water on the interior walls of the upper end of the evaporator. Connected to the nozzle fitting 40, is a check valve 41, which is, in turn, connected via a short curved pipe 45 to a fitting 66 mounted in the boss 30, so that as water is pumped through the coil 26, the water is cooled and is delivered via its upper end 29 and the check valve to the nozzle fitting 40 and is sprayed or atomized from the nozzle end 42 in the presence of $CO_2$ gas. At least a portion of the finely divided cold water impinges on the cold interior wall of the upper end of the evaporator.

It is well known that, the colder the water, the greater its power to absorb $CO_2$ gas, therefore by spraying or atomizing the already cold water on the slightly colder wall of the evaporator, I obtain a maximum absorption of the gas by the water.

Now, in order to increase the time in which the divided water is in contact with the gas I may employ, for example, a helical member 43 supported on a central tubular shaft 44. I am aware of the fact that such devices have been used before in this art for the same purpose. However, I have a distinct advantage in so forming my helical member that it must be forced into the inner opening in the evaporator, and since this helical member is formed of metal, it is in heat exchange relation to the evaporator. From this it will be seen that I not only increase the time of contact between the water and the gas, but I also provide a long metallic path for it and this path is refrigerated by the evaporator.

Preferably the carbonator is maintained approximately one third full of carbonated water and, although many different methods may be used for shutting off a motor driven pump (to be presently described) which forces the water through the cooling coil 26 and the spray nozzle 42, I prefer to use the change in weight of the carbonated water in the device to control said motor driven pump. One such arrangement is shown in Figure 7. An annular ring 46 forms a socket for the head end 33 of the tank 31 and it may be tack-welded to said head at several spaced points. Formed integral with the ring 46 is an annular flange portion 47. A spaced series of cups 48 may be spot welded to the lower surface of the flange portion 47. An annular ring 49 has an inner surface clearing the periphery of the flange portion 47, and formed integral with the upper end of the ring 49 is an inwardly projecting flange 50 which overlies the flange portion 47. The lower end of the ring 49 is flared outwardly at 51 with a shoulder formed inside. A closure plate 52 rests on said shoulder and carries cups 53 similar to and in alignment with the cups 48. The closure plate may be secured to the shoulder by means of screws (not shown), and mounted in the center of the plate is a switch 54 of the spring loaded plunger type having an actuator plunger 55 which when depressed by engagement with the convex lower end of the tank opens the switch. When the tank becomes lighter due to the withdrawal of a predetermined quantity of carbonated water, the plunger 55 is released and allows the switch to close. Positioned in the aligned cups above described are compression springs 56 of sufficient strength to counterbalance the weight of the tank, its contents and the pull of the conduit connected thereto when the tank is approximately one third full of carbonated water.

In Figure 8 is shown diagrammatically a motor driven water pump 57 including a motor 58. A conductor 59 leads from one terminal of the motor to a wire 60 which may be connected to one side of a source of current via a double pole switch 61. A wire 62 is connected to the other pole of the switch 61 and is in turn connected via a branch wire 63 to the switch 54, and the switch 54 is in turn connected to the other terminal of the motor 58. With the supply switch 61 closed, the control switch 54 effects the operation of the motor driven pump when the tank becomes lighter and shuts it off as the tank becomes heavier.

Figure 5:
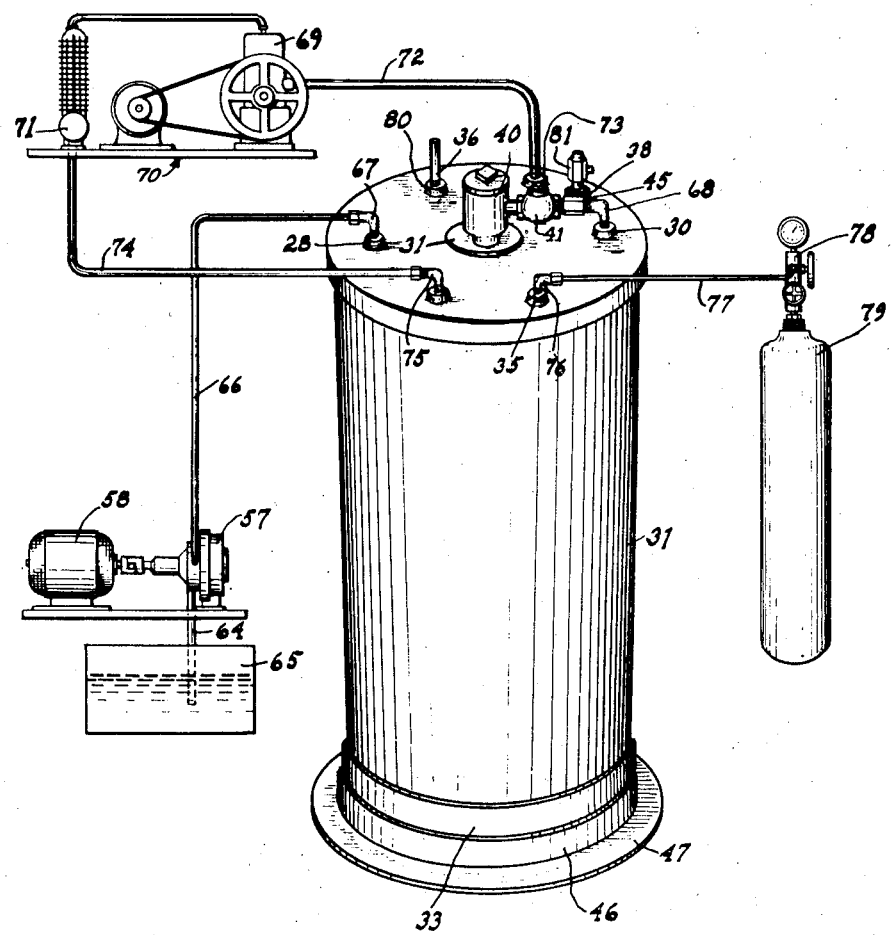
Figure 5 is a perspective view showing diagrammatically the connections of the several auxiliary elements to the tank.

In Figure 5 is shown schematically the several elements connected to the device. The water pump 57 has an inlet pipe 64 connected to a source of water supply 65, and its outlet pipe 66 connected to a fitting 67 in the boss 28, which in turn leads the water through the water coil 26 wound about the evaporator 10 inside the tank 31. The outlet 29 of the water coil leads to the boss 30 and via the fitting 68, the pipe 45, and the check valve 41, to the spray head 40.

A refrigeration high side unit 70 has the suction of its compressor 69 connected via a pipe 72 to a fitting 73 in the boss 24, the latter being connected via pipe 23 to the interior of the upper end of the evaporator 10. The liquid receiver 71 is connected via a tubing 74 to a fitting 75 mounted in the boss 25. The tubing 74 may be of the so called "capillary" type which elminates the expansion valve, or it may be larger in diameter and include an expansion valve. Since both forms are well known in the art and form no part of the invention per se, they need not be described in detail.

The boss 35 carries a fitting 76 to which one end of a pipe 77 is connected. The other end of the pipe 77 is connected to a reducing valve 78 on a tank 79 of $CO_2$ gas.

The boss 36 carries a fitting 80 to which a pipe may be connected for leading carbonated water to a point of use. It has already been described that a pipe 37 (Figure 4) leads from the boss down to a point below the level of the carbonated water in the tank.

The boss 38 may carry a purge valve 81 for purging air from the tank.

Figure 6:
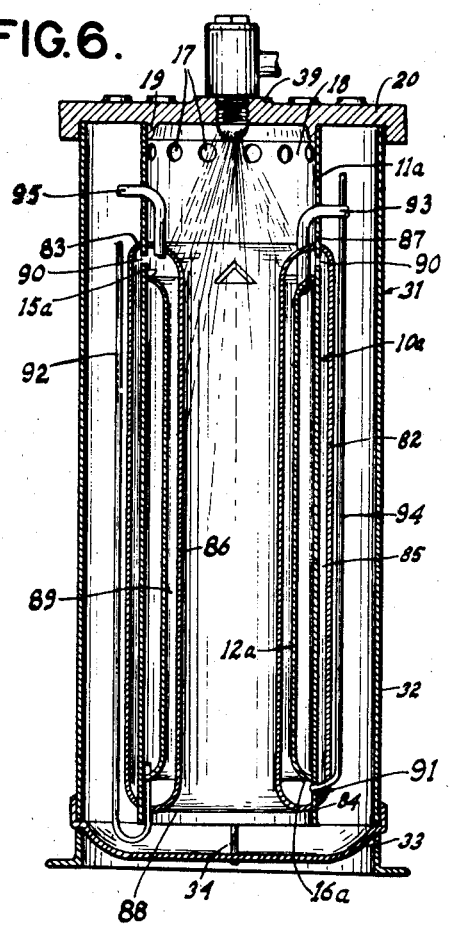
Figure 6 is a sectional elevation of a tank such as that shown in Figures 1 to 5 inclusive with a modified low side and water cooling element, and means for increasing the time the finely divided water is in contact with the $CO_2$ gas.

In the modification shown in Figure 6, the evaporator 10a is similar to the evaporator 10 above described. It consists of a tubular portion 11a with a tubular portion 12a smaller in diameter positioned within and flared out at each end to contact the inner wall of the portion 11a, and the two are welded together at 15a and 16a to form a fluid tight chamber therebetween. Now, instead of a water coil 26 wound about the evaporator as previously described, a third tubular portion 82, and a fourth tubular portion 86 are provided. The tubular portion 82 is larger in diameter than the portion 11a, and its ends 83 and 84 are flared inwardly to contact the outer wall of the portion 11a and are welded to the latter to form a water cooling chamber 85 therebetween.

The tubular portion 86 is smaller in diameter than the portion 12a and its ends 87 and 88 are flared outwardly to contact the tubular portion 11a and welded thereto to form a second water cooling chamber 89. Perforations 90, formed in the tubular portion 11a, provide communication between the upper ends of the cooling chambers 85 and 89, and the lower ends of these chambers communicate via similar perforations, one of which is shown at 91.

Figure 1:
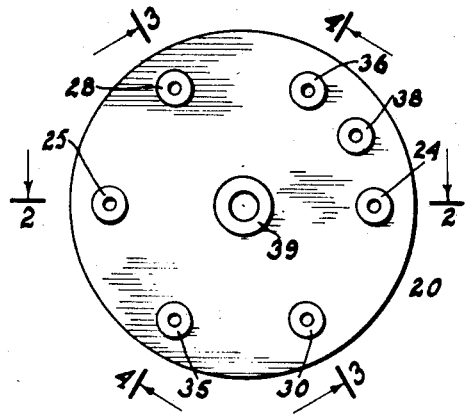
Figure 1 is a plan view, by way of example, of one embodiment of the invention.
Figure 3:
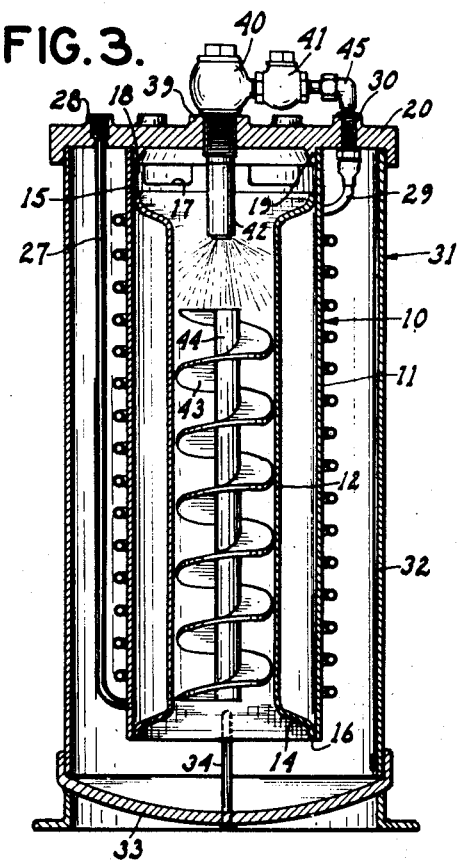
Figure 3 is a fragmentary sectional elevation taken along the lines 3—3 of Figure 1, and showing the circuit of the water through cooling coils prior to its atomization into the main tank.

The four portions so welded form a combination evaporator and water cooling unit which may be mounted on the head 20 in the same manner as described in connection with Figures 2 and 3.

A pipe 92 leads liquid refrigerant to the lower end of the evaporator 10a and the pipe 93 leads therefrom to the suction of the refrigerating high side unit (such as 69 Figure 5).

The water to be cooled enters the chamber 85 via a pipe 94, and cooled water leaves the chamber 89 via the pipe 95. The water passes from chamber 85 to chamber 89 via the perforations 90 and 91. The top plate 20 may be identical with the one shown in Figures 1 to 5 inclusive, and although the pipes above described are not shown, as connected thereto, they may be connected in the same manner as those shown in Figures 2 to 5 inclusive.

It is obvious that many changes may be made in the arrangements herein shown and described within the scope of the appended claims:

I claim:

1. In a carbonator, a tank, a tubular evaporator within and depending from the upper end of said tank, said evaporator having an inner and an outer wall with a space therebetween for refrigerant, open passages between the upper and lower ends of said evaporator and the upper and lower ends of said tank respectively, means for passing water through said tank in heat exchange relation to the outer wall of said evaporator prior to carbonating the same, means for supplying $CO_2$ gas under pressure to said tank, and means to spray the then cooled water in the form of a conical spray having its apex uppermost so as to cause at least a substantial portion thereof to impinge upon the inner wall of said evaporator in the presence of said gas to effect a maximum absorption of the gas by said water.

2. In a carbonator, a vertical drum-like vessel forming a tank having an upper end plate and having its lower end domed, a tubular evaporator positioned within said tank and having inner and outer walls with a space therebetween for refrigerant, means for guiding water to be cooled in heat exchange relation with the outer wall of said evaporator, said last means terminating outside of said tank, a spray nozzle connected to the terminus of said last means and positioned in spaced axial relation to the upper end of said evaporator, said nozzle being adapted to spray cooled water within the inner wall of said evaporator in the form of a conical spray having its apex near said upper end plate, whereby at least some of said spray impinges on the surface of said inner wall, means to deliver $CO_2$ gas to the interior of said tank, and means to deliver carbonated water from said tank, said end plate carrying connections for the entering and leaving water, the entering and leaving refrigerant, said $CO_2$ gas, and for the exit of said carbonated water.

3. In a carbonator, a tubular, vertical tank having an upper end plate and having its lower end domed, a tubular evaporator supported within said tank in spaced relation to both said ends and the interior wall thereof, conduit means surrounding and embracing said evaporator, inlet and outlet water connections to said conduit, means for connecting said evaporator to a refrigerating machine, connections from said tank to a source of $CO_2$ gas under pressure, and a connection leading upwardly from the lower end of said tank for carbonated water, all said connections passing through said end plate.

4. In a carbonator, a tank having a top closure plate secured thereto in fluid-tight relation, a tubular evaporator therein, said evaporator having inner and outer walls welded together on their ends to provide a fluid-tight space therebetween for refrigerant, said evaporator being supported by and depending from said plate, means to refrigerate said evaporator, means embracing the outer wall of said evaporator and defining a confined path through which water to be carbonated may pass, said last means being in heat exchange relation with said outer wall of the evaporator and precooling said water, means to supply $CO_2$ gas under pressure to the interior of said tank, a spraying device supported on said top closure plate and extending axially into the upper end of said evaporator, connections between said confined path and said device whereby the latter may spray the then cooled water downwardly within said evaporator in the form of a cone having its apex uppermost to cause at least a part thereof to impinge upon the inner wall of said evaporator in the presence of said gas, and means spaced apart from the lower end of said spray means for retarding the travel of droplets of said spray collected on said inner wall, toward the bottom of said tank.

5. In liquid and gas contact apparatus, a vertical, cylindrical vessel, a tubular evaporator vertically disposed within said vessel, said evaporator having inner and outer walls with a space therebetween for refrigerant, means to refrigerate said evaporator, a conduit embracing the outer wall of said evaporator through which water is cooled prior to carbonation, said conduit and said outer wall being spaced apart from and consequently in non-heat exchange relation with the inner wall of said vessel, means for supplying gas under pressure to said vessel, means for conveying liquid into, through, and out of said vessel, said liquid being in heat exchange relation with the outer wall of said evaporator during its passage through said vessel, and means to again deliver said liquid into said vessel through the top thereof in the form of a conical spray directed downwardly within the confines of said evaporator and in the presence of said gas, a substantial portion of said spray being adapted to impinge on the inner wall of said evaporator and adapted to slowly trickle down the surface thereof in contact with said gas, the temperatures of said liquid and of said evaporator being such that a maximum absorption of said gas by said liquid is effected.

6. In a carbonator, a tank, a tubular evaporator within and depending from the upper end of said tank, an open passage between the upper end of said evaporator and said tank, the bottom of said tank communicating with both the inner and the outer surfaces of said evaporator, means to refrigerate said evaporator, means to supply $CO_2$ gas under pressure to the interior of said tank, and means to inject water into the upper end of said tank in the form of a conical spray having its apex uppermost so that the spray impinges on the inner wall of said evaporator; whereby said water, cooled on the surface of said inner wall in the presence of said gas absorbs the latter and trickles down said surface towards the bottom of said tank.

JOHN ALFRED GRIER.

REFERENCES CITED

The following references are of record in the file of this patent:

UNITED STATES PATENTS

| Number | Name | Date |
|---|---|---|
| 736,523 | Hopkins | Aug. 11, 1903 |
| 2,172,420 | Tweed | Sept. 12, 1939 |
| 2,195,449 | Delen | Apr. 2, 1940 |
| 2,235,357 | Conklin | Mar. 18, 1941 |
| 2,271,896 | Lewis | Feb. 3, 1942 |
| 2,306,714 | Rowell | Dec. 29, 1942 |
| 2,337,783 | Thompson et al. | Dec. 28, 1943 |
| 2,348,791 | Di Pietro | May 16, 1944 |
| 2,396,460 | Di Pietro | Mar. 12, 1946 |